US006907932B2

(12) United States Patent
Reimert (10) Patent No.: US 6,907,932 B2
(45) Date of Patent: Jun. 21, 2005

(54) CONTROL POD LATCHDOWN MECHANISM (75) Inventor: Larry E. Reimert, Houston, TX (US)

(73) Assignee: Drill-Quip, Inc., Houston, TX (US)

( * ) Notice: Subject to any disclaimer, the term of this patent is extended or adjusted under 35 U.S.C. 154(b) by 0 days.

(21) Appl. No.: 10/764,199

(22) Filed: Jan. 23, 2004

(65) Prior Publication Data
US 2004/0159438 A1 Aug. 19, 2004

Related U.S. Application Data
(60) Provisional application No. 60/442,939, filed on Jan. 27, 2003.

(51) Int. Cl.[7] .............................................. E21B 29/12
(52) U.S. Cl. .................... 166/341; 166/344; 166/75.13; 166/368; 285/26
(58) Field of Search ................................ 166/341, 344, 166/338, 343, 351, 368, 360, 75.13; 285/26, 29, 33, 320, 920; 33/544.2, 302; 403/31

(56) References Cited

U.S. PATENT DOCUMENTS

| | | | |
|---|---|---|---|
| 1,588,198 A | | 6/1926 | Seguine |
| 3,332,484 A | * | 7/1967 | Watkins ...................... 166/338 |
| 3,486,556 A | * | 12/1969 | Burgess ...................... 166/338 |
| 3,516,492 A | * | 6/1970 | Petersen ..................... 166/343 |
| 3,551,005 A | * | 12/1970 | Brun ........................... 285/10 |
| 3,701,549 A | | 10/1972 | Koomey et al. |
| 3,817,281 A | | 6/1974 | Lewis et al. |
| 3,840,071 A | | 10/1974 | Baugh et al. |
| 3,841,665 A | * | 10/1974 | Capot ............................ 285/2 |
| 4,223,920 A | | 9/1980 | Van Bilderbeek |
| 4,439,055 A | * | 3/1984 | Quigg et al. ................. 403/330 |
| 4,490,073 A | * | 12/1984 | Lawson ....................... 405/169 |
| 4,610,570 A | * | 9/1986 | Brockway .................... 405/224 |
| 4,611,831 A | | 9/1986 | Truchet |
| 4,648,629 A | | 3/1987 | Baugh |
| 4,664,588 A | * | 5/1987 | Newell et al. ............... 414/730 |
| 4,905,938 A | * | 3/1990 | Braccio et al. .............. 244/101 |
| 5,479,721 A | * | 1/1996 | Wickander .................... 33/531 |
| 5,794,701 A | | 8/1998 | Cunningham et al. |
| 6,017,065 A | | 1/2000 | Hellesoe |
| 6,068,427 A | * | 5/2000 | .O slashed.stergaard .... 405/191 |
| 6,129,149 A | * | 10/2000 | Beall ........................... 166/344 |
| 6,471,250 B2 | * | 10/2002 | Smith, III ................. 285/124.1 |

FOREIGN PATENT DOCUMENTS

GB 2 390 654 A 5/2002

* cited by examiner

Primary Examiner—David Bagnell
Assistant Examiner—Thomas A Beach
(74) Attorney, Agent, or Firm—Browning Bushman P.C.

(57) ABSTRACT

A latchdown mechanism 11 latches a control pod 10 to a lower mounting plate 14 of a subsea tree. A receptacle housing 12 secured to subsea tree receives the control pod therein and has an interior latching surface 13 at an upper end of the receptacle housing. A latchdown actuator 15 is supported on the control pod, and moves a plurality of gripping arms 22 for engagement and disengagement with the latching surface to selectively connect and disconnect the control pod 12 to the structure in response to the latchdown actuator.

25 Claims, 13 Drawing Sheets

CONTROL POD LATCHDOWN MECHANISM

RELATED CASE

The present Application claims priority from U.S. Ser. No. 60/442,939 filed on Jan. 27, 2003.

FIELD OF THE INVENTION

This invention relates to subsea connection equipment and, more particularly, to a latchdown mechanism for a control pod.

BACKGROUND OF THE INVENTION

When oil or gas is produced from a subsea well, various types of releasable connectors may be used to latch the control pod in place. Hydraulically controlled latchdown mechanisms enable the use of detachable and retrievable control pods so that the controlling equipment may be retrieved to the surface for repair, if required. Hydraulic fluid used for control passes between the tree or other subsea structure and the control pod, and complimentary fluid openings must be aligned and sealed.

The mating surfaces which define the complimentary fluid openings may be preloaded and held in firm contact against various loads which may occur in varying directions and magnitude. It is therefore desirable to secure the connection in a symmetrical pattern since loading may occur in any direction.

Various linkages to accomplish lockdown of control pods are shown in U.S. Pat. Nos. 3,701,549, 3,817,281, 3,840,071 and 4,648,629. Rather than use face seals on mating tapered surfaces to connect hydraulic and/or electrical lines, present day control pods preferably use hydraulic and/or electrical coupler halves which are secured to the lower plate of the control pod and the upper receptacle plate of the subsea oilfield structure, such as a tree, so that springs or other biasing elements in these connectors are compressed when the control pod is moved to its final position. U.S. Pat. No. 4,223,920 shows a lockdown using wedged dogs. Other relevant patents of interest illustrating subsea connections include U.S. Pat. Nos. 3,486,556, 4,611,831, 5,794,701, 6,017,065, and 6,471,250.

Most control pod latchdown mechanisms have disadvantages which have limited their acceptance, particularly in deep water. The mechanism which latches the pod to the subsea tree frequently is not visible by an ROV, thereby presenting difficulties with assuring that the pod is properly latched to the tree. Some pod latchdown mechanisms require both a reciprocal and a rotational actuation motion to latch the control pod in place, thereby complicating the latchdown procedure. Many control pod latchdown mechanisms are not designed to perform latchdown using the abilities of an ROV, and instead use an umbilical line to the surface. While some latchdown mechanisms provide a latchdown force sufficient to connect the hydraulic couplers, prior art latchdown mechanisms do not move the control pod to decouple the couplers during the release of the latchdown mechanism.

The disadvantages of the prior art are overcome by the present invention, and an improved control pod latchdown mechanism suitable for latching a control pod and related control lines to a subsea oilfield structure is hereafter disclosed.

SUMMARY OF THE INVENTION

The present invention provides an improved control pod latchdown mechanism used to attach a control pod and related hydraulic lead lines to a subsea tree. The equipment preferably utilizes a centrally located actuator, and a plurality of latching or gripping arms spaced along the periphery and at or near the radial extent of the pod to latch the pod securely in place, and to provide preload to resist the inherent separating forces produced by energized couplers for the hydraulic lead lines. The latchdown mechanism may include a plurality of latching arms, a thrust collar, a pair of split rings consisting of an inner ring and an outer ring, and a guide funnel with one or more receptacles for receiving the latching arms. The latchdown mechanism may be activated to a latched position for fixed engagement with a receptacle housing and may also be unlatched for release from the receptacle housing by a suitable running tool, which may be hydraulically activated.

In a preferred embodiment, a latchdown mechanism includes a receptacle housing secured to the subsea structure for receiving the control pod therein, and has an interior latching surface at an upper end of the receptacle housing for cooperation with a plurality of gripping arms which are moved for engagement and disengagement with the latching surface in response to a latchdown actuator supported on the control pod. The latching surface on the receptacle housing may include one or more grooves or recesses in an inner surface of the receptacle housing for receiving the plurality of gripping arms. A latchdown actuator preferably is movable along a central axis substantially coaxial with the control pod central axis.

The latchdown mechanism may further include an upwardly extending sleeve secured to the control pod for guiding movement of a collar, with each of the plurality of gripping arms being pivotally mounted to the collar and to the control pod at a position radially outward of the collar. One of the control pod and receptacle housing is preferably provided with an axially extending slot having a radial thickness sized to receive a protrusion on the other of the control pod and the receptacle housing, thereby maintaining rotational alignment of the control pod with the receptacle housing prior to activating the latchdown mechanism.

Each of the plurality of gripping arms are preferably pivotally connected to the control pod such that movement of the latchdown actuator to an unlatched position produces a decoupling force between the control pod and the subsea structure which is greater than an unlatching force of the latchdown actuator.

These and further features and advantages of the present invention will become apparent from the following detailed description, wherein reference is made to the figures in the accompanying drawings.

DETAILED DESCRIPTION OF THE PREFERRED EMBODIMENTS

Figure 1:
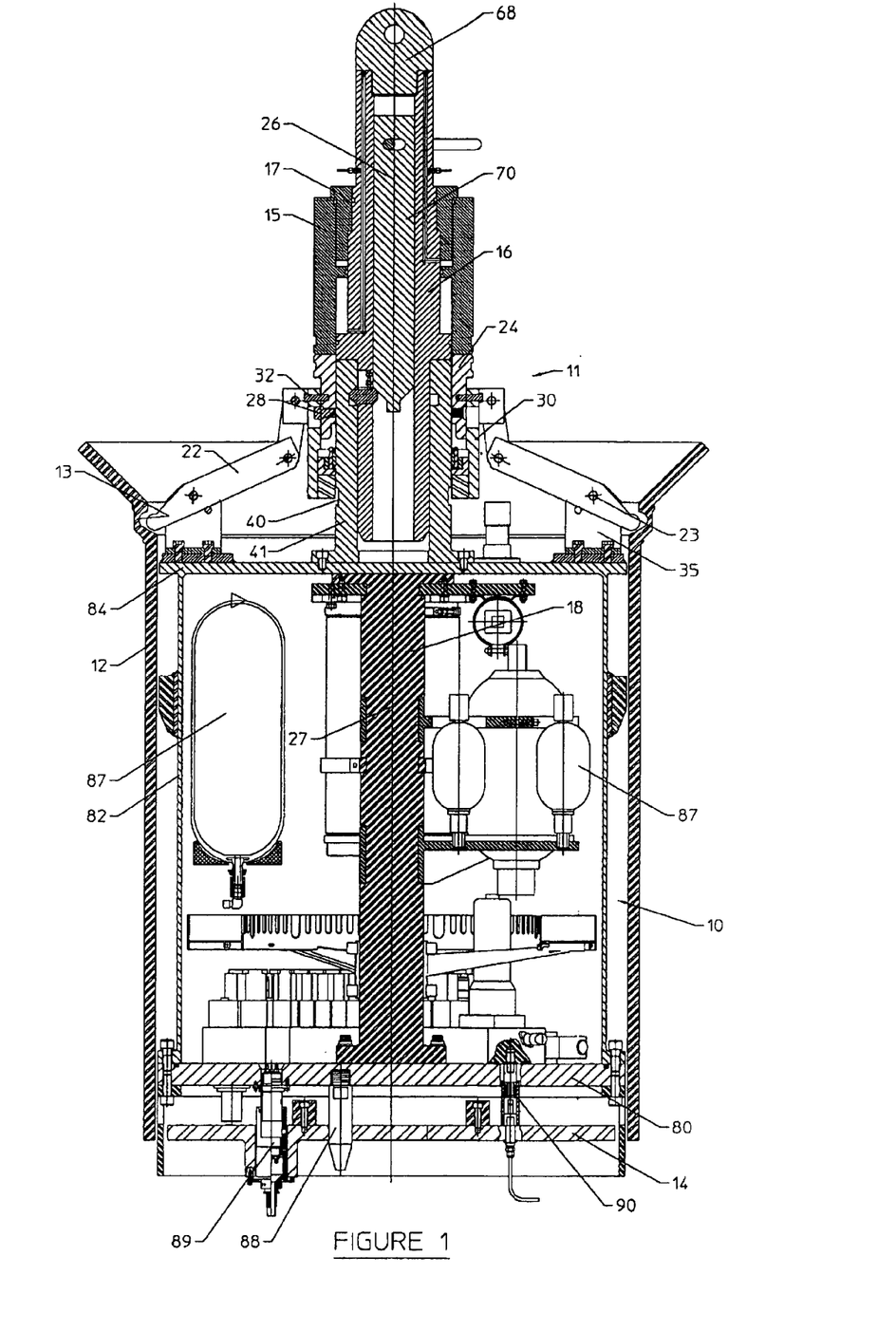
FIG. 1 illustrates in cross-section a suitable control pod according to the present invention with a latchdown mechanism for latching the pod to the subsea tree. The assembly as shown in FIG. 1 is shown in the running phase, i.e., when lowering the control pod on the subsea tree.
Figure 6:
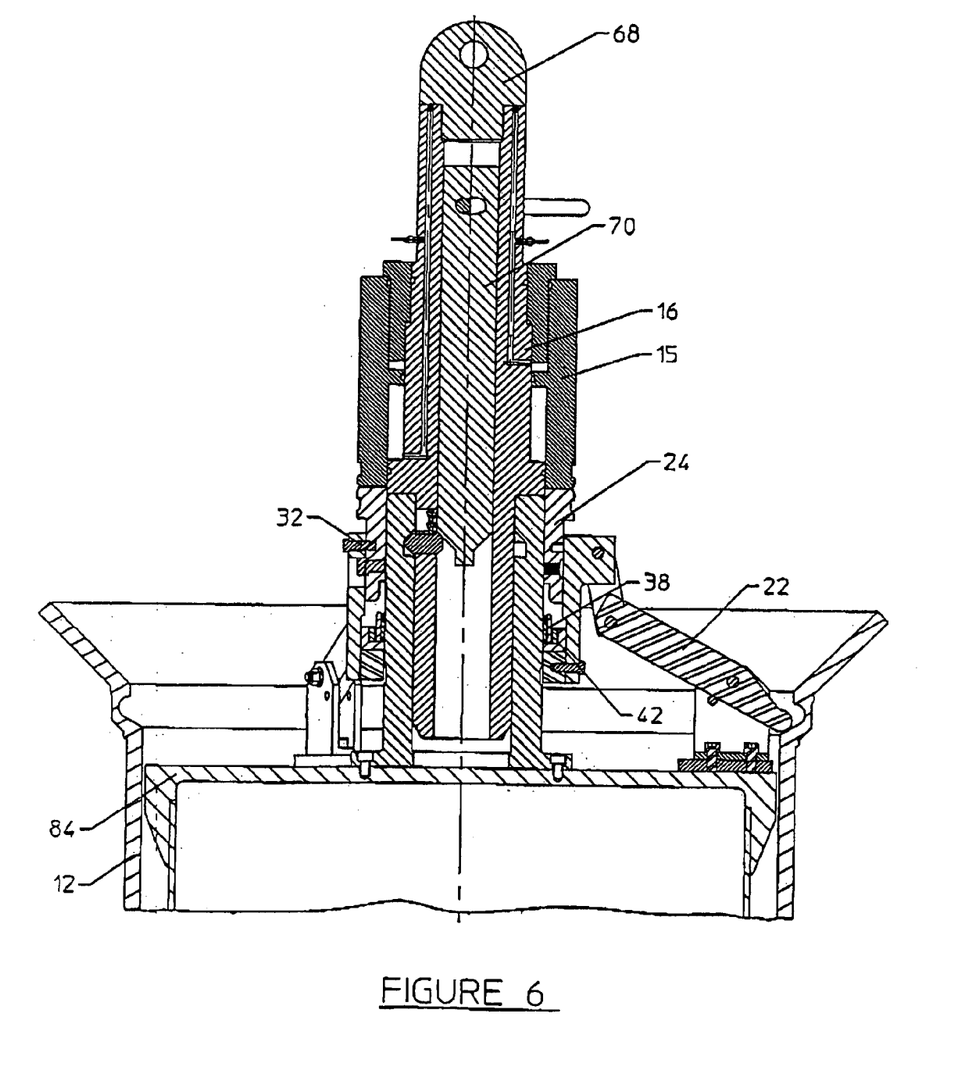
FIG. 6 illustrates a pod latchdown mechanism landed but not yet latched in place on a subsea tree.
Figure 7:
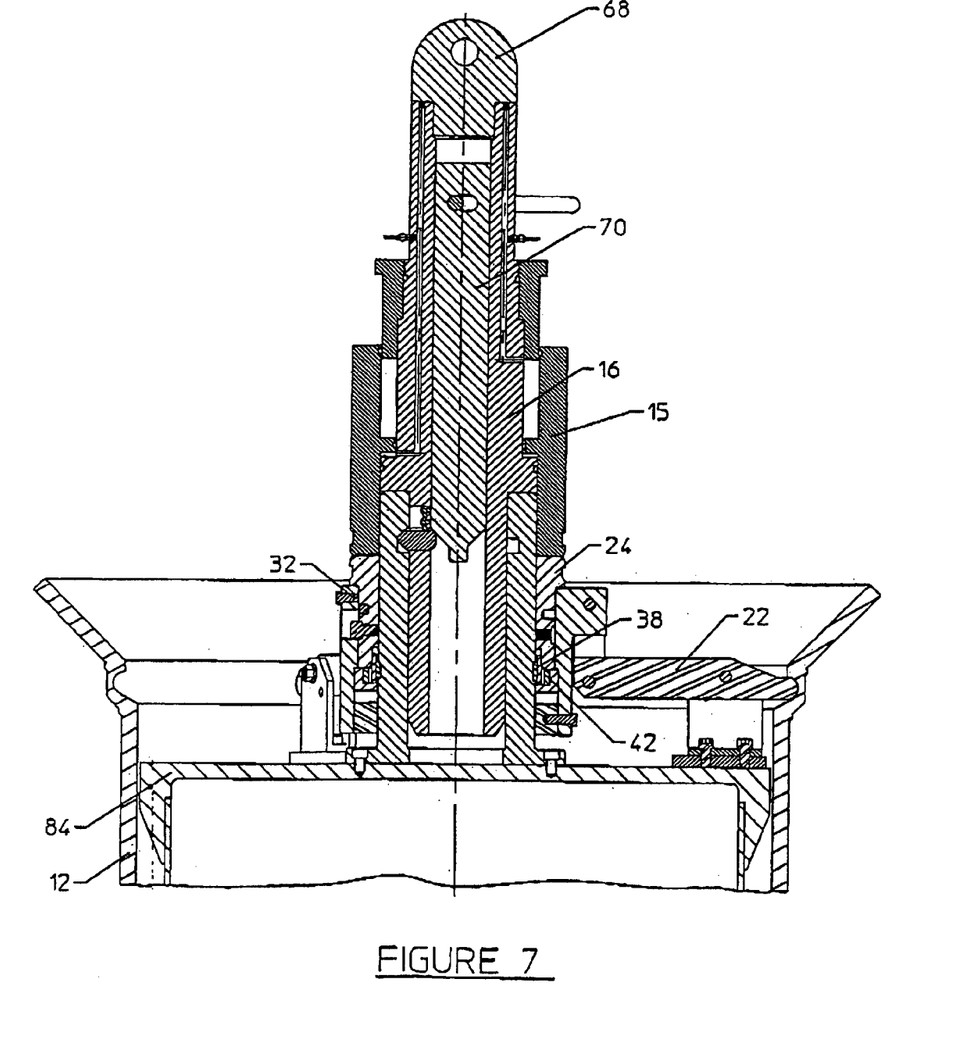
FIG. 7 illustrates the latching mechanism in the locked position, with the pins sheared.

As shown in FIG. 1 and in greater detail in FIG. 6, a suitable pod 10 may be lowered into position within a subsea tree receptacle or funnel housing 12 for engagement with receptacle plate 14 on the subsea tree. Housing 12 includes an annular groove 13 or is otherwise configured with a locking surface near the upper end of the housing for engagement with a latchdown mechanism 11. A running tool 10 shown in FIG. 13) may thus be secured to the control pod 10 to operate the latchdown mechanism 11 spaced above the control pod 10, with the running tool including an outer housing 15 and a bushing 17 enclosing a running tool head 16, which may rest on top of sleeve 41 secured to the pod stem 18. Control pod 10 as shown in FIG. 1 includes a lower mounting plate 80 secured to a lower end of the stem 18, a sleeve-shaped pod housing 82 extending upward from the plate 80, and a top plate 84. In other embodiments, the pod stem 18 may be eliminated, so that the pod housing structurally separates the lower plate 80 from the top plate 84.

A plurality of pressurized bottles 87 each mounted within the housing 82 supply fluid pressure to hydraulic couplers 90. One or more downwardly extending alignment pins 88 secured to the lower plate 80 may fit within a suitable receptacle in the plate 14 for precise rotational alignment for each of a plurality of hydraulic couplers 90, and preferably also a plurality of electrical and/or optic fiber couplers 89. A suitable subsea tree control system is thus provided within the housing 82 for transmitting fluid, electrical and/or fiber optic signals from the control pod 10 to a subsea tree. The funnel housing 12 surrounds the control pod 10 so that the pod fits within its receiving cavity which accommodates the full axial length of the control pod.

Figure 3:
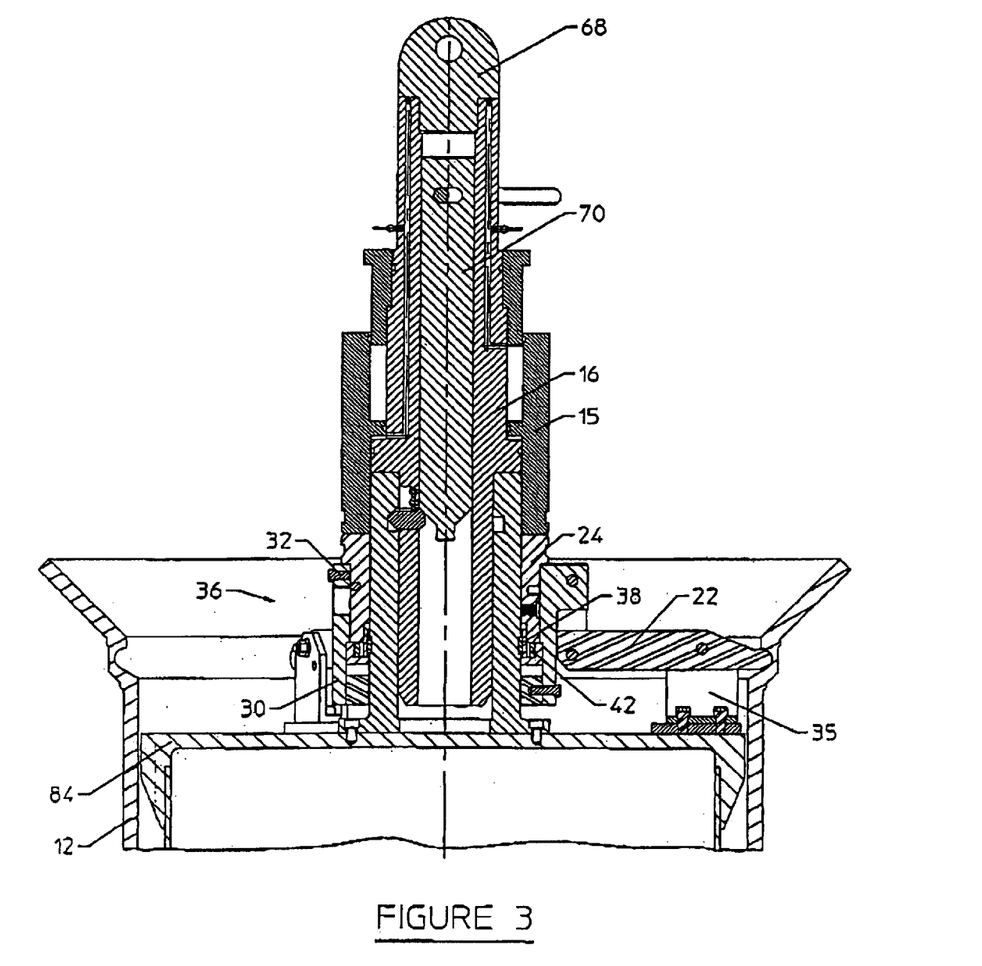
FIG. 3 is a more detailed cross-sectional view of an upper portion of the assembly shown in FIG. 2 in the latched position, and illustrating the latchdown mechanism locked in place.

Upon contact between the guide funnel receptacle housing 12 and the plurality of latching arms 22, as shown in FIG. 1, the running/retrieval tool may be activated to supply pressurized fluid to passageway 75 (see FIG. 4) and thus to chamber 77, forcing the housing 15 and thus the latch/retrieval cap 24 downward with respect to head 16 and sleeve 41. As shown in FIG. 1, each arm 22 is attached to the latch/retrieval cap 24 by connecting rod 28, thrust collar 30, and preload shear pin 32. The trust collar 30 thus serves as a movable latchdown actuator supported on the control pod to move the gripping arms between latched and unlatched positions. This linear movement of cap 24 and collar 30 with respect to the housing 12, with movement along head axis 26 preferably aligned with control pod axis 27, will result in each of the latching arms 22 rotating about its respective pivot point 23 on ear 35 extending upward from the top of plate 84 of the pod housing 82, thereby providing a generally downward force to the pod 10 by reaction with the receptacle housing 12. This action also results in forcing the ring carrier assembly 36 (see FIG. 3) downward until the inner split ring 38 enters a receiving groove 40 (see FIG. 1) on the sleeve 41 secured to the top of plate 84. After the inner ring 38 enters the receiving groove 40 as shown in FIG. 3, additional downward travel of the cap 24 will result in relative axial movement between the inner ring 38 and the outer split ring 42, and will result in preloading the latching assembly, primarily by the elastic deformation of the latching arms 22. Teeth on the ID of the outer ring 42 may thus ratchet downward with respect to teeth on the OD of the inner ring 38. FIG. 3 better illustrates the inner 38 and outer 42 split rings. Once the desired preload is effected, the preload shear pins 32 will shear, allowing the latch/retrieval cap 24 to move further downward relative to the ring carrier assembly 36, with the split rings 38, 42 in their preloaded condition, as shown in FIG. 3. FIG. 3 illustrates a cap 68 threaded to the head 16, and the latchdown mechanism in the locked position with the pins 32 sheared. The running tool may thus be hydraulically stroked to latch the pod to the subsea tree.

Figure 4:
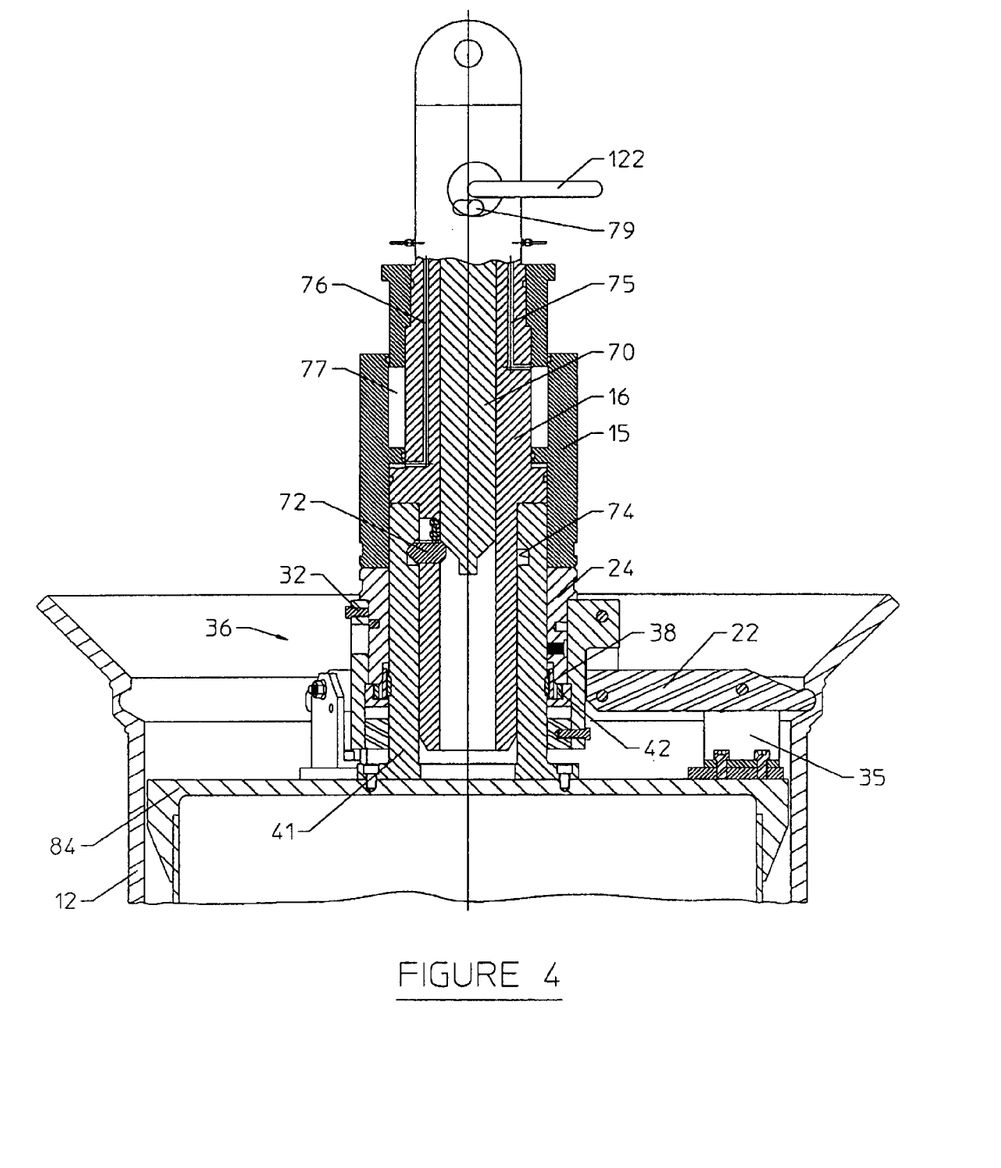
FIG. 4 better illustrates a suitable mechanical activation mechanism for moving a locking mandrel of a running tool.
Figure 5:
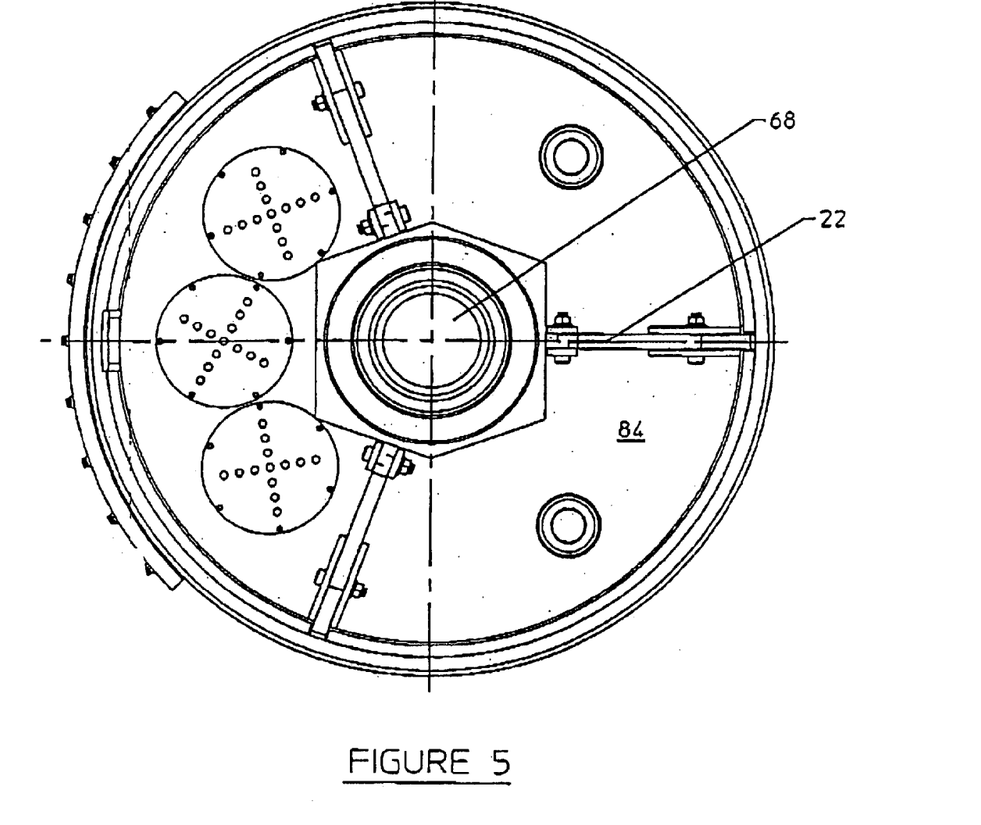
FIG. 5 is a top view of a control pod assembly generally shown in FIG. 1.
Figure 10:
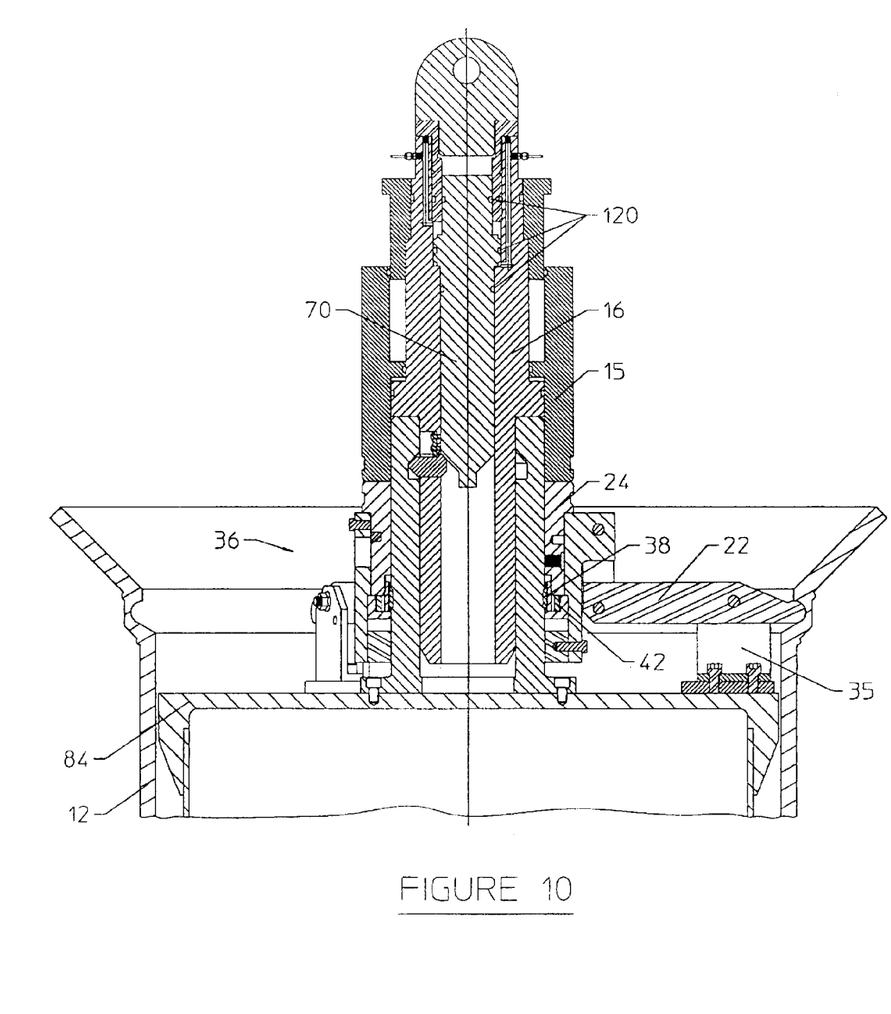
FIG. 10 illustrates a hydraulically powered piston for moving an actuator mandrel.

A technique for connecting head 16 of the running tool with the sleeve 41 will now be described. In response to axial movement of the locking mandrel 70 relative to housing 15, as explained subsequently, a plurality of circumferentially spaced dogs 72 move radially outward to fit within a groove 74 in the sleeve 41 secured to the top plate 84. Axial movement of the locking mandrel 70 may be achieved by various mechanisms, including an ROV rotating arm 122 to lower the mandrel 70 to the position as shown in FIG. 4. For this embodiment, lever arm 122 may rotate in a slot, thereby raising or lowering pin 79 attached to mandrel 70. For the embodiment as shown in FIG. 10, the actuator mandrel 70 is sealed to the head 16 by seals 120, thus becoming a hydraulically powered piston which is axially movable from the latched position to an unlatched position. Fluid pressure differential above and below the middle seal 120 thus controls axial movement of mandrel 70 relative to head 16. Movement of mandrel 70 thus mechanically connects and disconnects the head 16 from the sleeve 41. In each embodiment, the outer housing 15 may be retrieved with the head 16 and mandrel 70, with the latchdown mechanism 11 locking the pod 10 in place on the tree.

The gripping members 22 are desirably positioned along the periphery of and near the radial extent of the control pod. Gripping members 22 are thus arranged about the head 16, while the latchdown actuator (collar 30 as shown in FIG. 4) is centrally located with respect to a central axis of the control pod and axially movable with respect to the pod 10 to move the gripping members into gripping engagement with the housing 12 of the subsea tree, and may subsequently be moved axially to release the pod from the housing 12, as explained subsequently.

Figure 2:
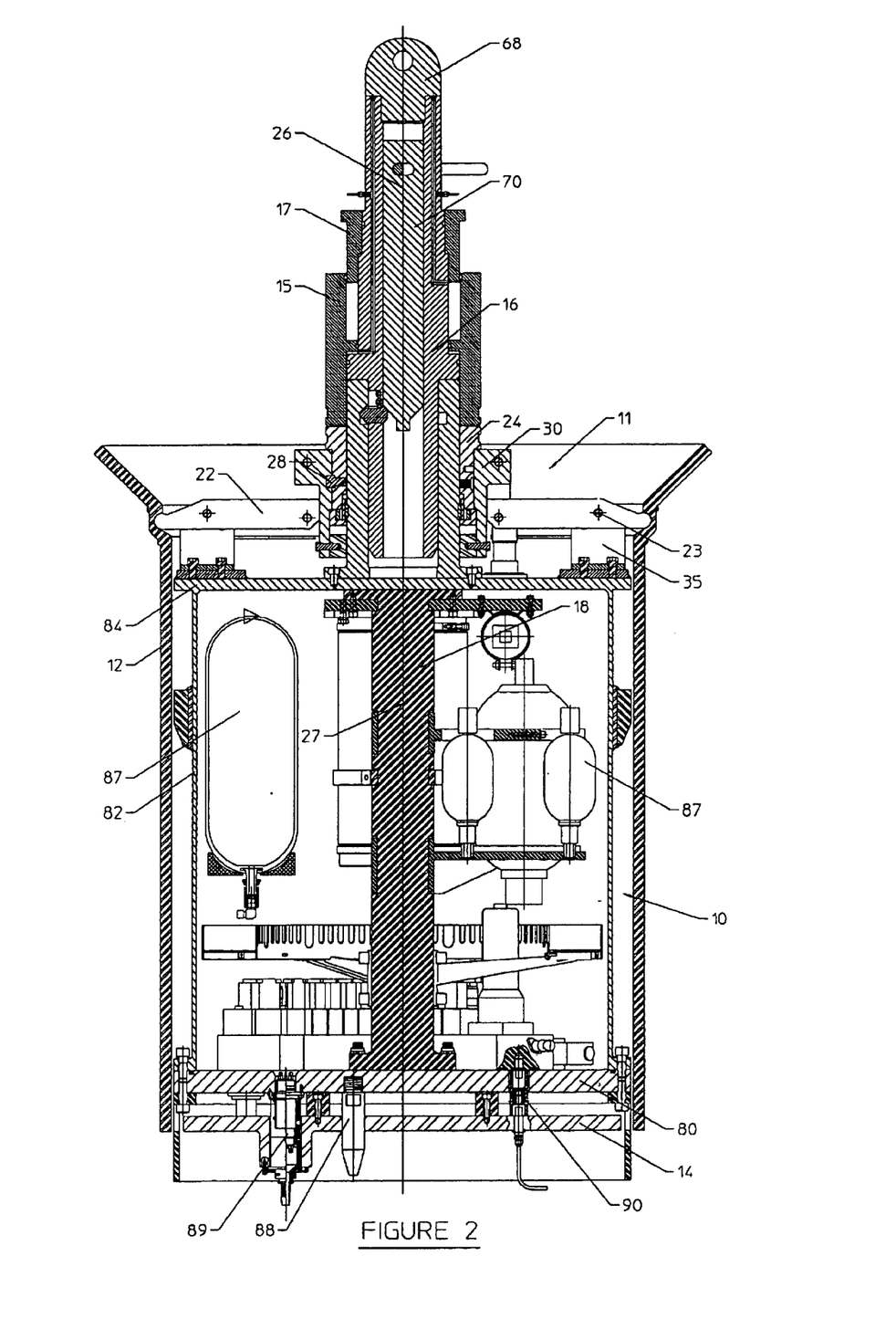
FIG. 2 illustrates the control pod shown in FIG. 1 latched to a receiver plate or junction plate of a subsea tree.

The plurality of arms 22 thus each engage the interior surface of the funnel housing 12 to latch the pod in place, with the latching groove 13 on the housing 12 being radially outward of the control pod. The sleeve 41 provides an interior cavity for receiving the head 16 and a portion of the locking mandrel 70, and an exterior which guides the latch retrieval cap 24 and the collar 30, which are moved axially in response to hydraulic fluid pressure which moves the housing 15. The arms 22 thus extend from the collar 30 which is guided by the sleeve 41 to the inner receiving surface or groove 13 on the funnel housing 12. As shown in FIG. 2, the arms 22 are substantially horizontal and thus lie within a plane substantially perpendicular to the central axis of the pod when in the latched position. Both the latching and unlatching of the pod from the receptacle plate 14 may be accomplished by vertical motion only of the housing 15 and the resulting pivoting action of the arms 22 with respect to the ears 35 and the latchdown collar 30, with no rotational movement about the pod axis required.

Figure 11:
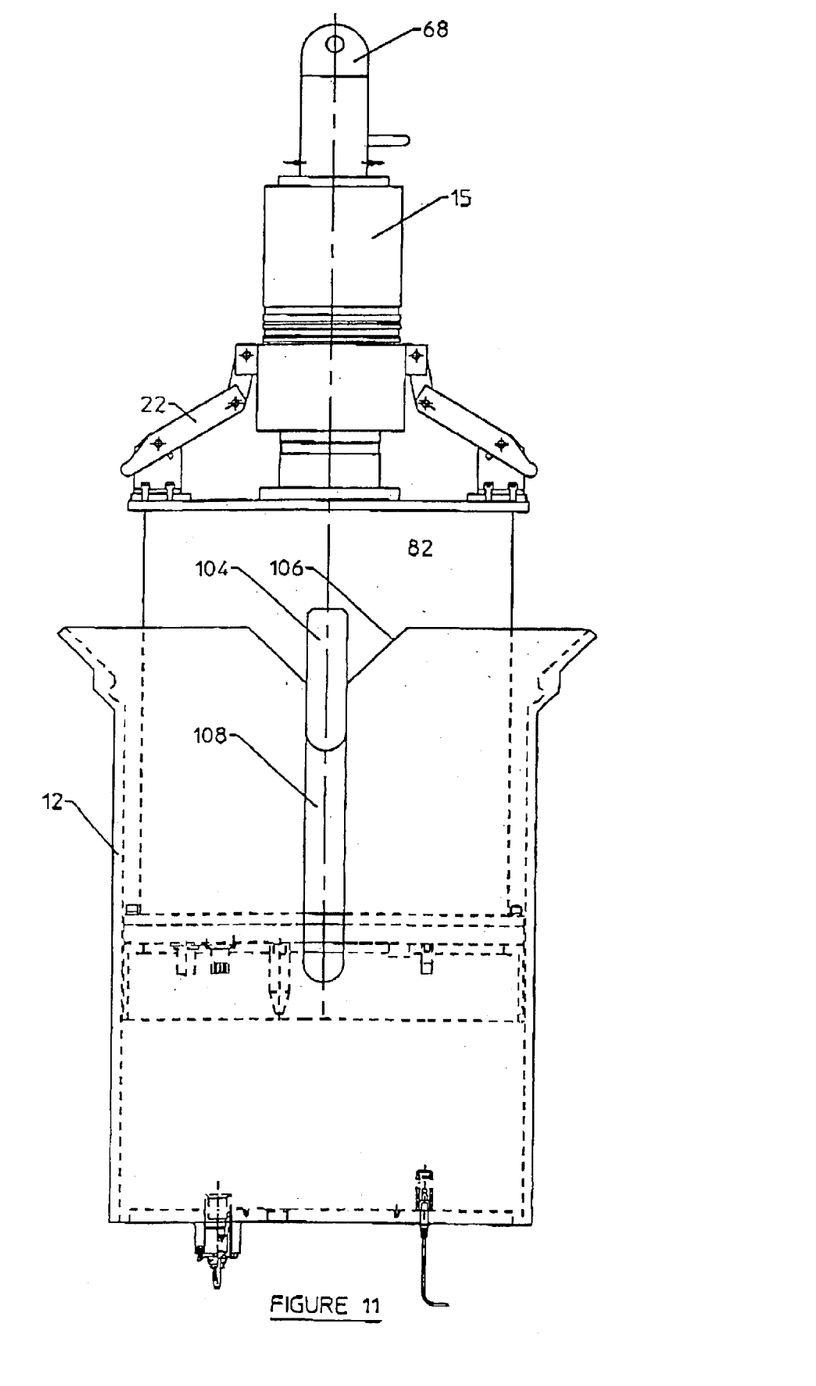
FIG. 11 illustrates a suitable arrangement for aligning the control pod with the funnel housing.

FIG. 11 depicts a suitable mechanism for rotationally aligning the control pod housing 82 with the funnel housing 12. In the depicted embodiment, a lug or other protrusion 104 extends radially outward from the pod housing 82 and fits within the elongate axial slot 108 in the interior of housing 12. In the FIG. 11 embodiment, an ROV may be used to roughly align the control pod with respect to the funnel housing, so that once alignment by the ROV is achieved within, e.g., 20°, the lug will engage the downwardly sloping surface 106, thereby aligning the protrusion 104 with the slot 108. Once rotational alignment is achieved, the pod may then be lowered within the outer housing 12 and the lockdown mechanism activated as disclosed herein. In an alternate embodiment, the lug may be provided on the interior of housing 12 and the slot provided in the control pod housing 82. In yet another embodiment, the entire circumferential surface at the upper end of the housing 12 may be angled to guide the lug into the slot.

The ROV may first rotate arm 122 until dogs 72 move radially outward to fit within groove 74 in sleeve 41, thereby connecting the head 16 with the sleeve 41. Pressurized fluid may be passed into cylinder 77 (see FIG. 4) forcing housing 15 downward until ring 38 captures latch/retrieval cap 24. Ports 75, 76 in head 16 prevent hydraulic lock up, and are supplied with pressurized fluid to lower and raise housing 15, respectively.

Figure 8:
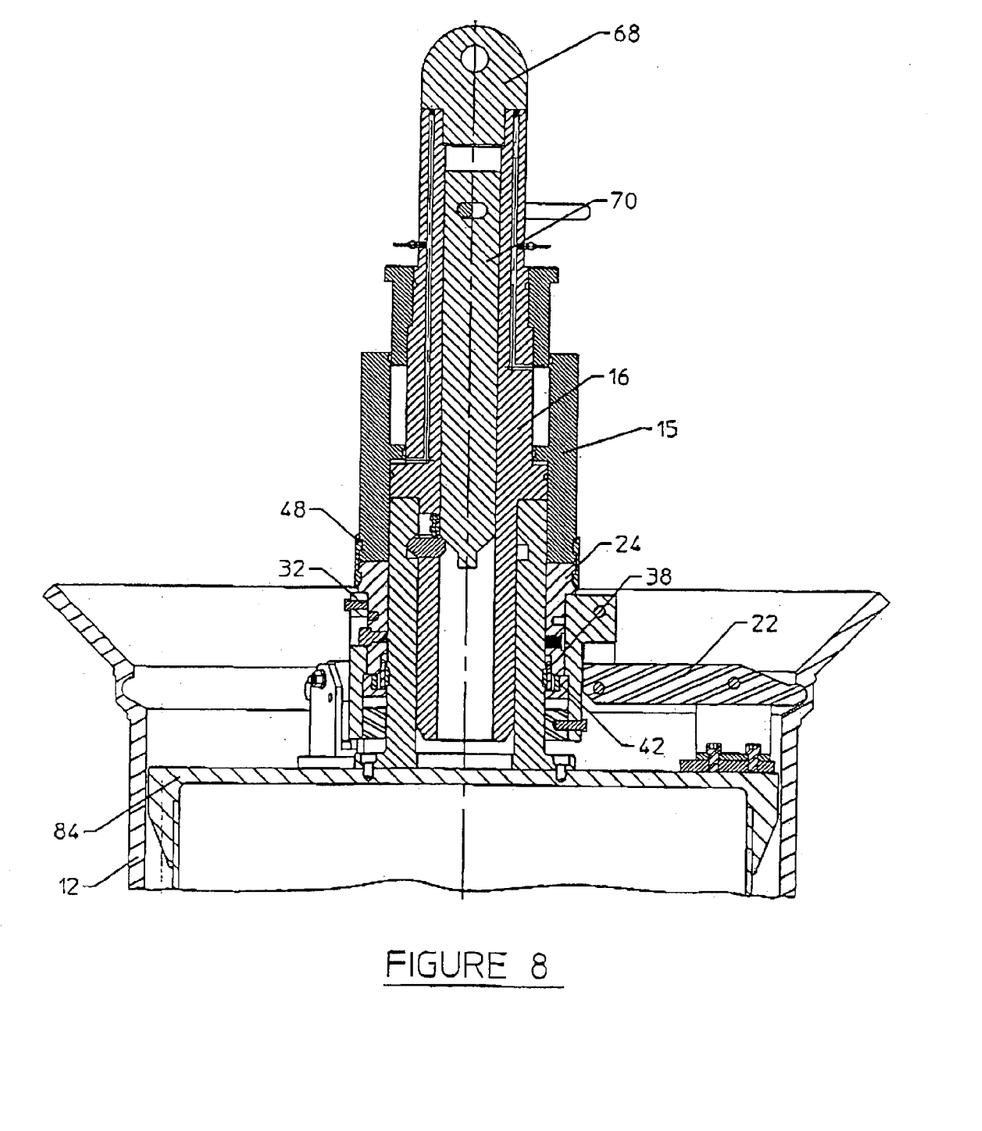
FIG. 8 illustrates the latchdown mechanism in the retrieval position.

To retrieve a control pod, a retrieval ring 48 as shown in FIG. 8 may be latched between the cap 24 and the outer housing 15. Fluid may then be passed through passageway 76 into chamber 78 (see FIG. 9), reversing the direction of travel of housing 15 and moving latch/retrieval cap 24 upward. As cap 24 moves upward, split rings 38 and 42 may separate radially and are no longer latched. Additional upward movement of cap 24 moves collar 30 connected with cap 24 by bolts 28 upwards. As collar 30 moves upward, collar 97 secured by shear pins 98 to collar 30 will move upward, raising the ring carrier assembly 36, including split rings 38 and 42, with the collar 30. Additional upward movement of carrier 30 rotates arms 22 about pivots 23, releasing the pod 10 from the subsea tree funnel housing 12.

Figure 9:
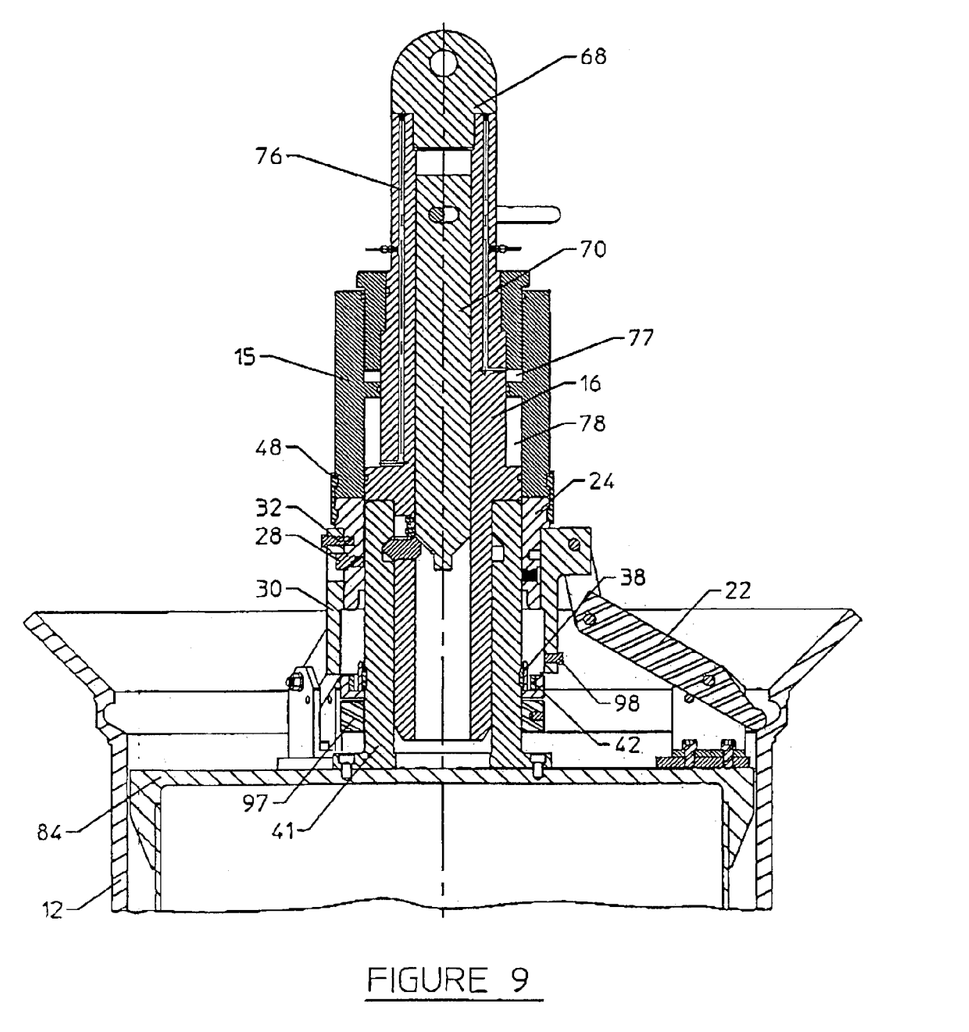
FIG. 9 illustrates the latchdown mechanism in the override position.

In the event the inner ring 38 does not extricate itself from the groove 40 in the sleeve 41, the force supplied by the running/retrieval tool may be increased until the retrieval shear pins 98 are overstressed, as shown in FIG. 9, thereby shearing to allow upward movement of the thrust collar 30 to release the pod from the tree.

It is apparent from the above disclosure that the latchdown mechanism preferably is provided above the top plate 84 of the control pod and thus above the chamber formed by the pod housing. This feature allows the latchdown operation to be readily visible by an ROV so that high reliability of the latchdown operation may be assured. The motion of mating the couplers between the control pod and the subsea tree, whether those couplers are hydraulic, electrical or fiber optic, is substantially parallel to the motion of the latchdown actuating mechanism, e.g., housing 15 is hydraulically moved along an axis which is substantially parallel to the axis of the couplers 89, 90. The latchdown mechanism as disclosed herein thus provides a latching force which moves control pod 10 downward within the housing 12 during the final makeup of the couplers while overcoming the biasing force of the couplers, then when coupled reliably resists separation of the couplers in response to the fluid pressure.

During the unlatching operating, the upward movement of the housing 15 moves the inner end of the arms 22 upward, while the outer end of the arms engages the housing 12 to provide a separating force on the hydraulic and electrical couplers. Moreover, during both latching and unlatching, the applied force due to hydraulic pressure moving of the housing 15 is enhanced by the mechanical advantage of the pin 23 as shown in FIG. 1 being spaced closer to the radially outward end of each arm 22 than the inner end of each arm, so that during unlatching a separating force on the hydraulic couplers is provided which is substantially greater than the applied force producing the upward movement of the housing 15. This mechanical advantage may result in a latching and an unlatching force which is from two to three times the applied force due to hydraulic pressure acting on the housing 15. During unlatching, the entire control pod may thus be raised a selected distance, e.g., three fourths of an inch, to disconnect the couplers in the bottom of the control pod from their mating components in the receptacle plate 14. Upward movement of the housing 15 during unlatching is thus axially opposite to downward movement of the housing 15 during latching.

Figure 12:
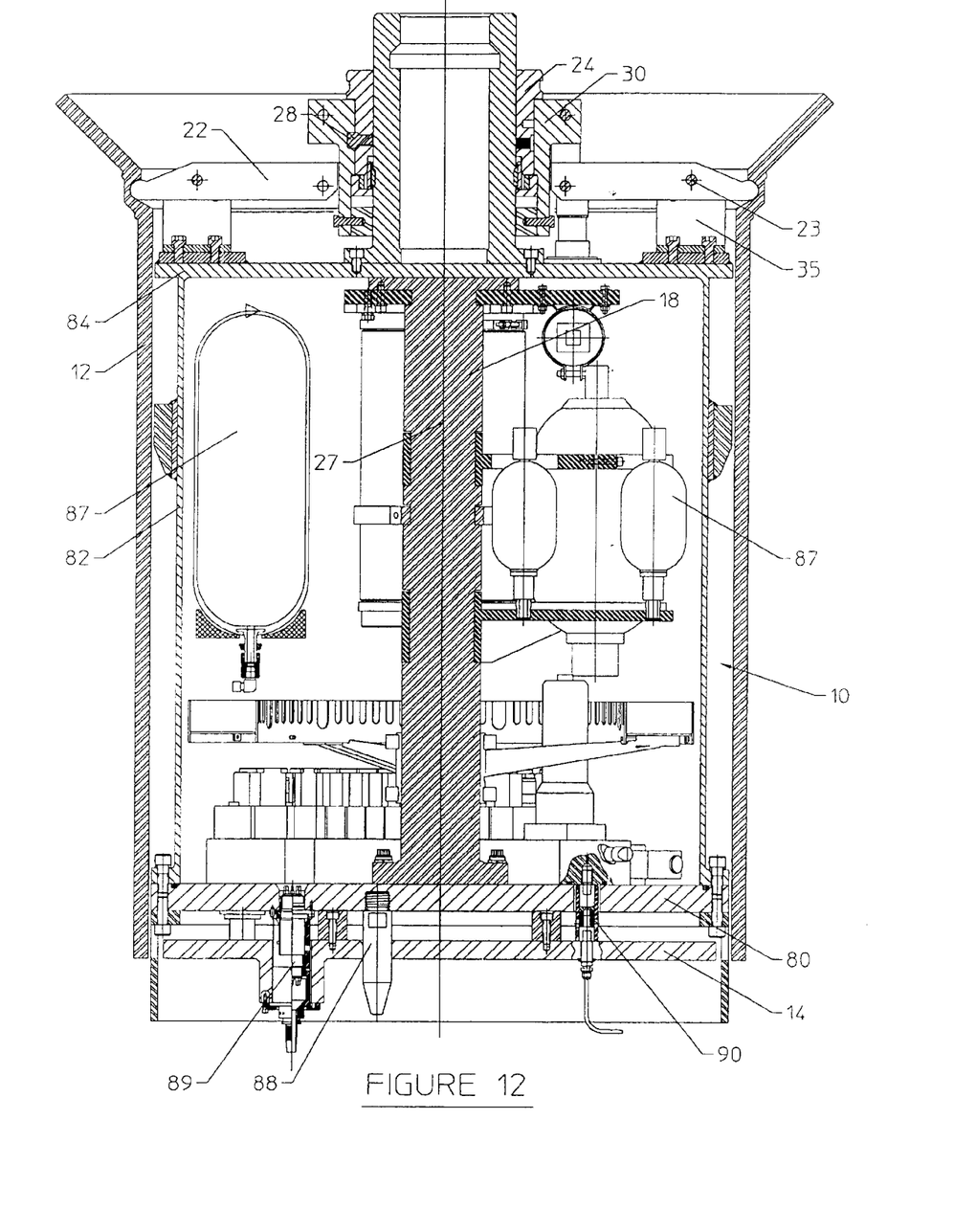
FIG. 12 illustrates the control pod in place within the receptacle, the latchdown mechanism in place and the running tool removed.
Figure 13:
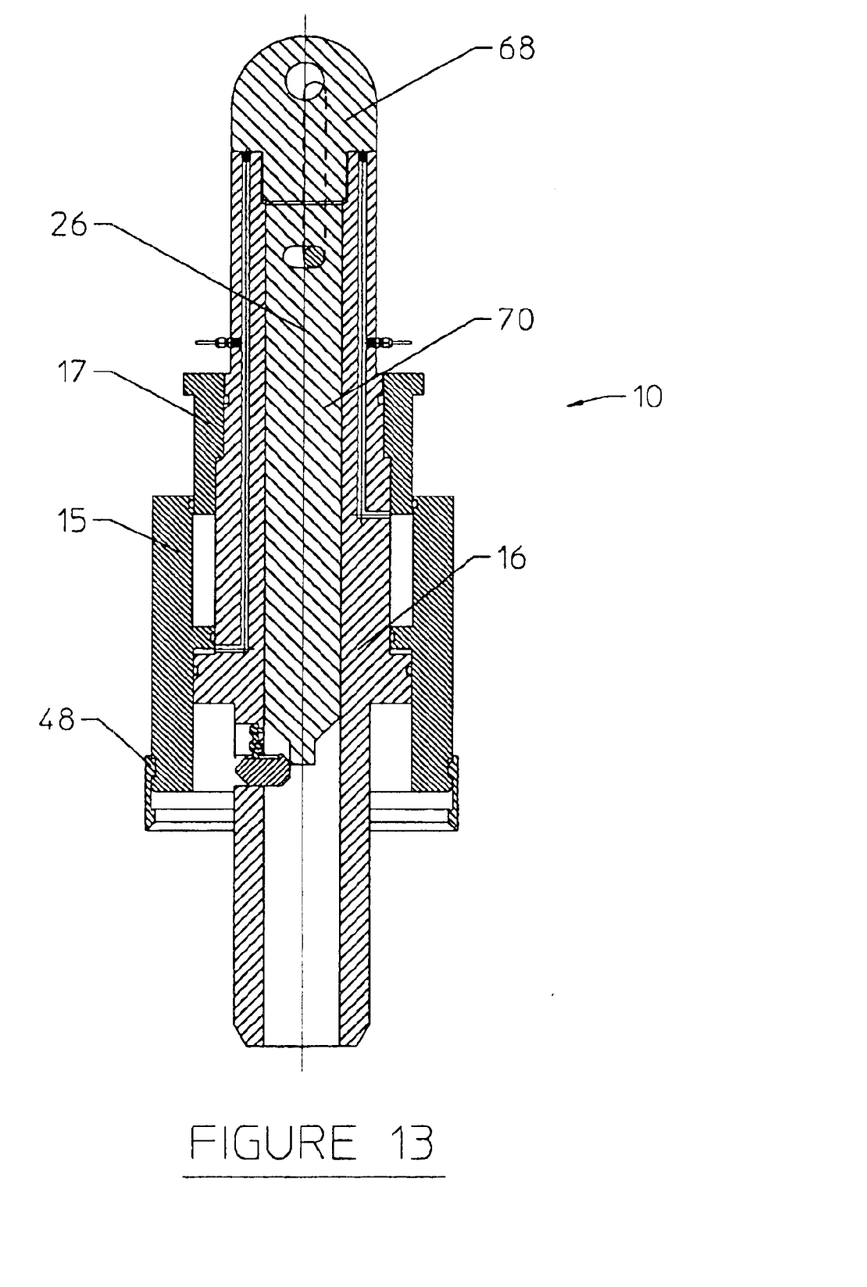
FIG. 13 illustrates a suitable hydraulically actuated running tool.

FIG. 12 depicts control pod 10 latched within the receptacle housing 12 by the plurality of latching arms 22. The control pod 10 is thus in place with the coupler components on the lower plate 80 of the control pod mated with the coupler components on the receptacle plate 14 of the subsea tree or other subsea oilfield structure. A suitably hydraulic powered running tool 10 as shown in FIG. 13 has thus been physically removed from the latching mechanism shown in FIG. 12, and subsequently may be reinstalled with the head 16 positioned and within the sleeve 41, and the running tool 10 then activated to unlatch the arms 22 from the receptacle housing, as shown in FIG. 9, for retrieval of the control pod from the receptacle housing.

A significant feature of the invention is that the control pod may be landed on the subsea tree in a position prior to locking the pod to the tree. A further feature of the invention is that the fluid and electrical connectors at the bottom of the pod are physically separated from the latchdown mechanism which connects the upper end of the pod to the tree. The latchdown mechanism thus need not fit within the area between the bottom of the pod and the tree. By providing the receptacle housing with the locking surface near an upper end of the receptacle housing, a camera on an ROV may assure the operator that the pod is properly positioned before locking the pod to the tree.

The control pod may be latched to a subsea oilfield structure by a hot line extending from an ROV to move the housing 15, as discussed above, and both the latching and unlatching operation do not require an umbilical extending to the surface. In response to hydraulic pressure, downward motion of the housing 15 rotates the arms 22 to latch the control pod to the housing 12, and upward movement of the housing 15 rotates the arms to unlatch the control pod for retrieval. The control lines between the control pod and the subsea oilfield structure, whether hydraulic, electrical or fiber optic, will thus have coupler components extending through a lower mounting plate of the control pod and mating components extending through the upper receptacle plate of the subsea oilfield structure.

In an exemplary embodiment, a subsea tree is the disclosed form of the subsea oilfield structure to be controlled by the control pod. Those skilled in the art will appreciate that subsea oilfield structures other than trees may similarly be controlled by the control pod and latchdown mechanism as disclosed herein.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A pod latchdown mechanism for latching a control pod to a subsea oilfield structure having control lines extending to a coupler component supported on a receptacle plate on the subsea oilfield structure for cooperation with a coupler component supported on a lower mounting plate on the control pod, the control pod including a pod housing defining a pod chamber therein, the latchdown mechanism comprising:

a subsea receptacle housing secured to the subsea structure for receiving the control pod therein and having a latching surface at an upper end of the receptacle housing above the pod chamber when the coupler components are mated;

a latchdown actuator movably supported on the control pod; and a plurality of gripping arms for engagement and disengagement with the latching surface to selectively connect and disconnect the control pod from the oilfield structure in response to movement of the latchdown actuator.

2. A latchdown mechanism as defined in claim 1, further comprising:

the latching surface on the receptacle housing includes at least one recess in an inner surface of the receptacle housing for receiving the plurality of gripping arms.

3. A latchdown mechanism as defined in claim 1, wherein the latchdown actuator is movable along a central axis substantially coaxially with a control pod central axis.

4. A latchdown mechanism as defined in claim 1, wherein the latchdown actuator comprises a collar movable between an unlatched position and a latched position and pivotally connected to the plurality of gripping arms, thereby moving the plurality of gripping arms into and out of engagement with the latching surface on the receptacle housing.

5. A latchdown actuator as defined in claim 4, further comprising:

a hydraulically powered running tool for moving the collar between the latched and unlatched positions.

6. A latchdown mechanism as defined in claim 4, further comprising:

an upwardly extending sleeve secured to the control pod for guiding movement of a collar.

7. The latchdown mechanism as defined in claim 6, wherein each of the gripping arms lies with the plane substantially perpendicular to a central axis of the control pod when in the latched position.

8. A latchdown mechanism as defined in claim 6, further comprising:

a ring carrier assembly radially outward of the sleeve and including a split ring for securing the plurality of gripping arms in engagement with the latching surface on the receptacle housing.

9. A latchdown mechanism as defined in claim 8, further comprising:

the sleeve includes an internal sleeve groove; and the split ring is received within the sleeve groove when the gripping arms are in engagement with the latching surface.

10. A latchdown mechanism as defined in claim 8, further comprising:

a shear member for interconnecting the ring carrier assembly with the collar, such that the shear member may shear to release the collar from the ring carrier assembly to move the plurality of gripping arms out of engagement with the latching surface.

11. A latchdown mechanism as defined in claim 1, further comprising:

one of the control pod and the receptacle housing being provided with an axially extending slot having a radial thickness sized to receive a protrusion on the other of the control pod and the receptacle housing for rotationally aligning the control pod with respect to the receptacle housing prior to activating the latchdown mechanism.

12. A latchdown mechanism as defined in claim 1, further comprising:

a locking mandrel on a running tool axially movable with respect to a running tool head from an unlocked position to a locked position, such that the running tool head is selectively secured to the control pod;

a sleeve secured to the pod and having a central bore for receiving the running tool head; and one or more locking members radially movable with respect to the running tool head in response to axial movement of the locking mandrel to lock the running tool head to the sleeve.

13. A latchdown mechanism as defined in claim 12, further comprising:

a crank mechanism for controlling axial movement of the locking mandrel with respect to the running tool head.

14. A latchdown mechanism as defined in claim 12, wherein the locking mandrel is a hydraulically powered piston movable from an unlocked position to a locked position.

15. A pod latchdown mechanism for latching a control pod and related control lines to a subsea oilfield structure, the latchdown mechanism comprising:

a subsea receptacle housing secured to the subsea structure and having a latching surface including at least one recess in an inner surface of the receptacle housing;

a collar movable between an unlatched position and a latched position, thereby moving a plurality of gripping arms into and out of engagement with the latching surface of the receptacle housing; and the plurality of gripping arms are positioned along a periphery of the control pod for engagement and disengagement with the latching surface to selectively connect and disconnect the control pod from the oilfield structure in response to movement of the collar.

16. A latchdown mechanism is defined in claim 15, further comprising:

one of the control pod and the receptacle housing being provided with an axially extending slot having a radial thickness sized to receive a protrusion on the other of the control pod and the receptacle housing for rotationally aligning the control pod with respect to the receptacle housing prior to activating the latchdown mechanism.

17. A latchdown mechanism as defined in claim 15, further comprising:
   an upwardly extending sleeve secured to the control pod for guiding movement of the collar; and
   each of the plurality of gripping arms are pivotally mounted to the collar and to the control pod at a position radially outward of the collar.

18. A pod latchdown mechanism for latching a control pod to a subsea oilfield structure, the control pod including a pod housing having an upper pod member defining a pod chamber below the upper pod member, the latchdown mechanism comprising:
   a subsea receptacle housing secured to the subsea structure for receiving the control pod therein;
   a latchdown actuator movably supported on the control pod; and
   a plurality of gripping arms positioned along a periphery of the control pod for selective engagement and disengagement with the receptacle housing, above the upper pod member when the control pod is landed in the subsea oilfield structure, the plurality of gripping arms being pivotally connected to the control pod such that movement of the latchdown actuator to an unlatched position produces a decoupling force between the control pod and the subsea structure greater than an unlatching force of the latchdown actuator.

19. A latchdown mechanism as defined in claim 18, further comprising:
   the subsea receptacle housing has a cavity therein to receive the control pod extending axially over substantially the entire length of the control pod, the receptacle housing including an inner profile to latch the control pod to the subsea structure in response to movement of the latchdown actuator with respect to the control pod.

20. A latchdown mechanism as defined in claim 18, further comprising:
   one of the control pod and the receptacle housing being provided with an axially extending slot having a radial thickness sized to receive a protrusion on the other of the control pod and the receptacle housing for rotationally aligning the control pod with respect to the receptacle housing prior to activating the latchdown mechanism.

21. A pod latchdown mechanism for latching a control pod with a control pod central axis to a subsea oilfield structure having control lines extending through a receptacle plate on the subsea oilfield structure for cooperation with control lines extending through a lower mounting plate on the control pod, the latchdown mechanism comprising:
   a subsea receptacle housing secured to the subsea structure for receiving the control pod therein and having an interior latching surface at an upper end of the receptacle housing;
   a latchdown actuator supported on the control pod;
   a plurality of gripping arms positioned along a periphery of the control pod for engagement and disengagement with the latching surface to selectively connect and disconnect the control pod from the oilfield structure in response to the latchdown actuator;
   an upwardly extension sleeve secured to the control pod for guiding movement of a collar;
   each of the plurality of gripping arms are pivotally mounted the collar and to the control pod at a position radially outward of the collar; and
   one of the control pod and the receptacle housing being provided with an axially extending slot having a radial thickness sized to receive a protrusion on the other of the control pod and the receptacle housing for rotationally aligning the control pod with respect to the receptacle housing prior to activating the latchdown mechanism.

22. A latchdown mechanism as defined in claim 21, further comprising:
   the latching surface on the receptacle housing includes at least one recess in an inner surface of the receptacle housing for receiving the plurality of gripping arms.

23. A latchdown mechanism as defined in claim 21, wherein collar movable between an unlatched position and a latched position, thereby moving the plurality of gripping arms into and out of engagement with the latching surface on the receptacle housing.

24. A latchdown mechanism as defined in claim 21, further comprising:
   a locking mandrel axially movable with respect to a tool head from an unlocked position to a locked position, such that the tool head is selectively secured to the control pod;
   the sleeve having a central bore for receiving the tool head; and
   one or more locking members radially movable with respect to the tool head in response to axial movement of the locking mandrel to lock the tool head to the sleeve.

25. A latchdown mechanism as defined in claim 21, wherein the plurality of gripping arms are pivotally connected to the control pod such that movement of the latchdown actuator to an unlatched position produces a decoupling force between the control pod and the subsea structure greater than an unlatching force of the latchdown actuator.

* * * * *

UNITED STATES PATENT AND TRADEMARK OFFICE
CERTIFICATE OF CORRECTION

PATENT NO. : 6,907,932 B2  Page 1 of 1
DATED : June 21, 2005
INVENTOR(S) : Larry E. Reimert It is certified that error appears in the above-identified patent and that said Letters Patent is hereby corrected as shown below:

Column 9,
Line 20, change "housing," to -- housing --.

Signed and Sealed this

Twenty-third Day of August, 2005

JON W. DUDAS
*Director of the United States Patent and Trademark Office*